United States Patent [19]
Cohen

[11] Patent Number: 5,389,411
[45] Date of Patent: Feb. 14, 1995

[54] COMPOSITE STRUCTURE FORMING A WEAR SURFACE

[75] Inventor: Edward I. Cohen, Annapolis, Md.

[73] Assignee: The United States of America as represented by the Secretary of the Navy, Washington, D.C.

[21] Appl. No.: 125,715

[22] Filed: Sep. 24, 1993

[51] Int. Cl.6 .................. F01C 19/04; B32B 17/00; A47G 19/22
[52] U.S. Cl. .................. 428/34.6; 428/34.4; 428/210; 428/222; 428/256; 428/408; 428/34.5; 428/698; 428/902; 418/156; 418/157
[58] Field of Search .............. 418/156, 157; 428/34.6, 428/210, 222, 256, 34.5, 408, 698, 902, 34.4

[56] References Cited

U.S. PATENT DOCUMENTS

| | | | |
|---|---|---|---|
| 4,276,331 | 6/1981 | Bothwell | 428/36 |
| 4,450,872 | 5/1984 | Orcutt | 138/149 |
| 4,618,318 | 10/1986 | Hansen | 418/111 |
| 5,211,999 | 5/1993 | Okada | 428/34.5 |

*Primary Examiner*—Charles R. Nold
*Attorney, Agent, or Firm*—Gary G. Borda

[57] ABSTRACT

A pre-stressed composite liner structure is provided for tribological systems typically associated a pump, engine, compressor or systems having bearings rotating within a journal. A hollowed ceramic core is concentrically wound with cladding material in the form of a filament or braid. The ceramic core and the wound cladding form an interference fit with one another to pre-stress the ceramic core in terms of tensile strength.

14 Claims, 2 Drawing Sheets

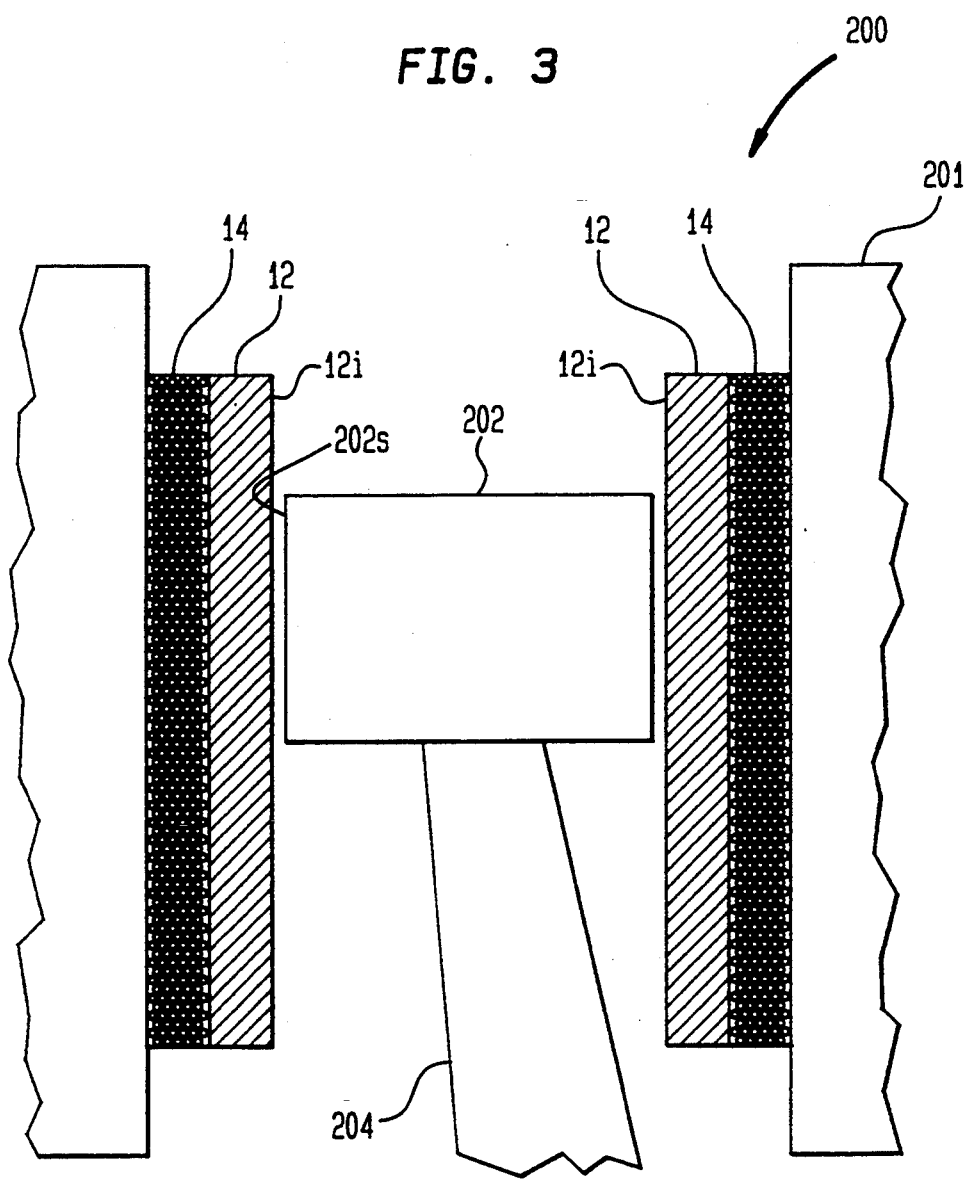

COMPOSITE STRUCTURE FORMING A WEAR SURFACE

The invention described herein may be manufactured and used by or for the Government of the United States of America for governmental purposes without payment of any royalties thereon or therefor.

FIELD OF THE INVENTION

The invention relates generally to liners for tribological systems associated with pressure containing envelope devices such as pumps, engines and compressors, and more particularly to a pre-stressed composite structure liner forming a wear surface for tribological systems associated with such pressure containing envelope devices.

BACKGROUND OF THE INVENTION

Displacement type pumps, compressors, engines and similar devices include tribological systems where rubbing and wear occurs. Sliding vanes on a cam surface, a piston reciprocating within a bore and bearings rotating in a journal are examples of such systems requiring a strong and durable wear surface. Existing technology makes use of replaceable or expendable liners that form the wear surfaces. Materials for such liners typically include nodular iron, bronze or stellite depending on the device and the media in contact with the liner. Liners with their supporting structure are designed to withstand system pressure, developed internal pressure and shock. It is also desirable that the rubbing or wear surfaces are constructed from durable materials to promote a long wearing life. Some examples of existing techniques for producing long wearing liner surfaces include plating, weld overlay, plasma flame spray and heat treatment. However, drawbacks associated with these existing practices include flaking, excessive wear, heat checking (i.e., cracking) and corrosion.

In an attempt to overcome some of these drawbacks, ceramic liners have been used. Ceramic materials are able to withstand high compressive stresses but are weak with respect to tensile strength that can result in a brittle form of failure. Therefore, if a ceramic is to be used as a liner, the liner and supporting structural design must have sufficient tensile strength capable of handling developed hoop stresses resulting from internal pressure.

In current ceramic liner structural design, a machined titanium ring is placed over a ceramic cam ring's outside diameter using a thermal difference fitting technique well known in the art. The technique places the ceramic cam ring liner in a pre-stressed compressive state while the outside titanium ring is placed in a pre-stressed tensile state. However, high machining costs are associated with this approach due to the precision fit that is required between the liner's outside diameter and the titanium ring's inside diameter.

SUMMARY OF THE INVENTION

Accordingly, it is an object of the present invention to provide a pre-stressed liner for use in tribological systems typically associated with a pump, compressor or engine.

Another object of the present invention is to provide a liner that forms the inner wearing surface of tribological systems typically associated with a pump, compressor or engine device such that the liner withstands both the compressive stresses and tensile or hoop stresses delivered by the device, and further, that the liner offers a durable wearing surface.

A further object of the present invention is to provide a pre-stressed liner for use in tribological systems typically associated with a pump, compressor or engine that offers a reduced cost of fabrication over the prior art pre-stressed liners.

Other objects and advantages of the present invention will become more obvious hereinafter in the specification and drawings.

In accordance with the present invention, a pre-stressed composite liner structure is provided for tribological systems typically associated with a pump, engine, compressor or systems having bearings rotating within a journal. A hollowed ceramic core has an inside circumference that forms an inner wear surface of the liner structure. A wound cladding concentrically surrounds the ceramic core. The ceramic core and the wound cladding form an interference fit with one another. The ceramic core provides a long wearing surface capable of withstanding compressive stress while the wound cladding provides the necessary pre-stress so that the overall composite structure can withstand tensile stress. The ceramic core is selected from the group of materials consisting generally of silicon nitride, aluminum oxide, tungsten carbide, silicon carbide and metal matrix composites. The wound cladding is a filament or braid wound cladding material selected from the group consisting generally of carbon, glass, boron and Kevlar TM.

BRIEF DESCRIPTION OF THE DRAWINGS

FIG. 3 is a cross-sectional side view of a reciprocating pump fitted with the composite structure forming the wear surface according to the present invention.

DETAILED DESCRIPTION OF THE INVENTION

Figure 1:
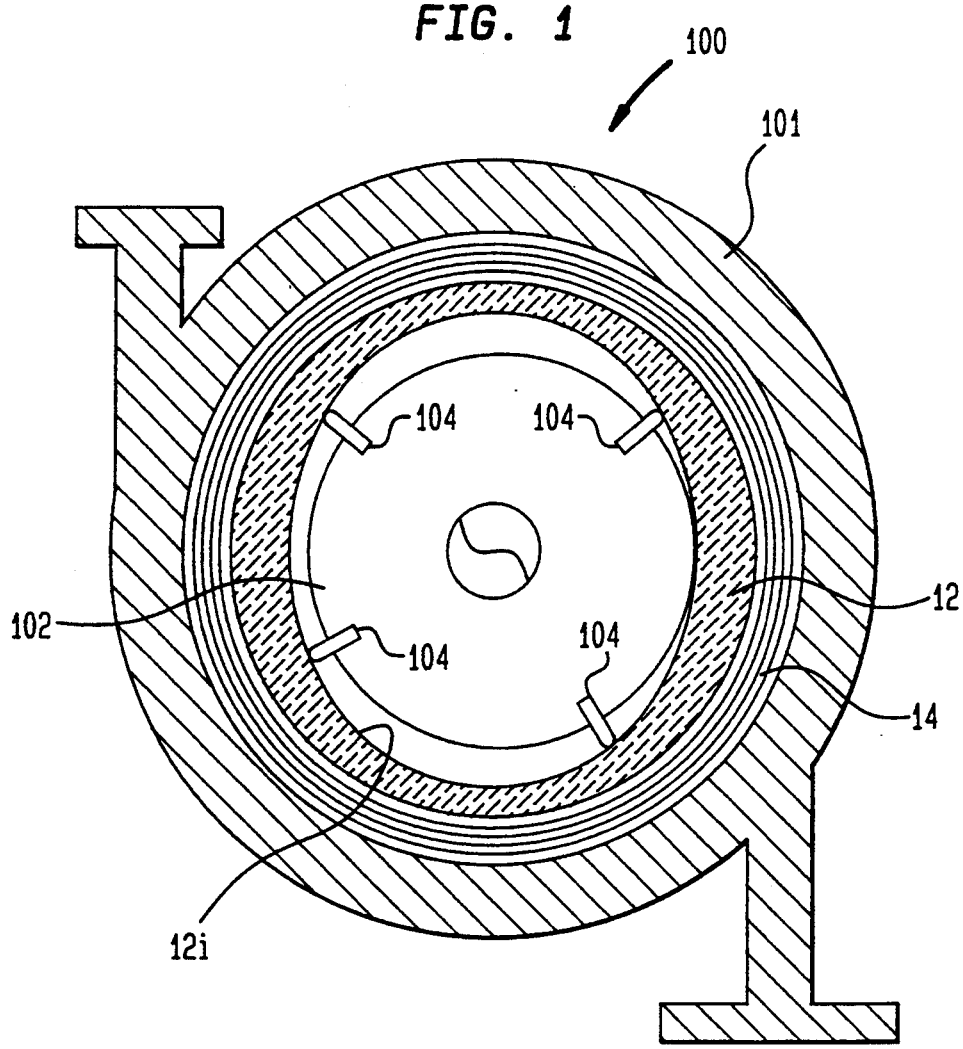
FIG. 1 is a cross-sectional end view of a sliding vane rotary pump fitted with the composite structure forming the wear surface according to the present invention.

Referring now to the drawings, and more particularly to FIG. 1, a composite structure according to the present invention for forming the inner wear surface of a pressure containing envelope device such as a sliding vane rotary pump 100 is shown in a cross-sectional end view. However, it is to be understood that the present invention applies equally as well to a wide variety of tribological systems that may be found in or associated with reciprocating pumps as well as engines, compressors and systems having bearings rotating within a journal.

The moving portion of pump 100 is a rotor 102 having vanes 104 attached thereto. The composite structure of the present invention fits within pump housing 101 and includes a ceramic liner 12 and a wound outer cladding 14. As rotor 102 rotates, vanes 104 rub against inner wear surface 12i of liner 12.

The material hardness of ceramic provides a durable, long-wearing surface capable of withstanding constant rubbing imparted by the pump's vanes 104 as well as withstanding compressive forces acting on liner 12. The particular ceramic chosen for liner 12 will be based on the application, economics and design constraints. By way of example, some choices of the ceramic liner material include, but are not limited to, silicon nitride, aluminum oxide, tungsten carbide, silicon carbide and metal matrix composites.

While ceramic liner 12 offers a durable inner wear surface 12i and further is capable of withstanding high compressive forces, ceramic liner 12 possesses poor tensile properties for coping with hoop stress. Hoop stress is defined as the unit force acting tangentially on any free-body segment of liner 12. To provide a liner structure that is also capable of coping with developed hoop stress, wound outer cladding 14 is provided to pre-stress liner 12. Specifically, cladding 14 is a filament wound or braid wound cladding directly wound or placed in tension around liner 12. The winding of the filament or braid may be carried out by any filament or braid winding techniques well known in the art and is not a limitation on the present invention.

The winding of cladding 14 may be applied directly on ceramic liner 12 to a desired tension and thickness and then cured in place according to specification. In this way, an interference fit can be formed between cladding 14 and ceramic liner 12 to properly pre-stress ceramic liner 12 without any machining of cladding 14. This approach may be employed on a monolithic liner and has the added advantage of allowing ceramic liner 12 to be fabricated from segments or pieces that are held together by the winding process. A segmented liner may find particular utility in the construction of large diameter liner structures. In another approach, cladding 14 may be wound and cured as a separate component and then placed on ceramic liner 12. To form the necessary pre-stressing interference fit between ceramic liner 12 and cladding 14, the two may be press-fit together under force or by means of a thermal difference technique well known in the art.

As mentioned above, cladding 14 may be filament or braid wound. The winding typically includes a winding material and resin system. Many such systems are available and application requirements will dictate the ultimate choice in system, thickness of cladding 14, etc. By way of example, carbon or graphite fibers may be used for high stress applications while lower cost, glass fibers may be sufficient in lower stress applications. Fibers made from boron or Kevlar TM may also be used. Alternatively, cladding material selection might take the thermal properties thereof into consideration to promote heat transfer through the liner wall or provide insulating qualities. Resin systems (e.g., epoxy, polyester or phenolic based systems) may be applied during the winding process or, alternatively, may be impregnated in the filament or braid material.

The advantages of the present invention are numerous. A composite structure liner includes a ceramic inner wear surface that provides a durable contact surface for a pressure containing envelope device, as well as offering a corrosion and generally contaminant resistant contact surface. Machining costs are minimized by pre-stressing the ceramic liner with a filament or braid wound cladding surrounding the ceramic inner wear surface.

Figure 2:
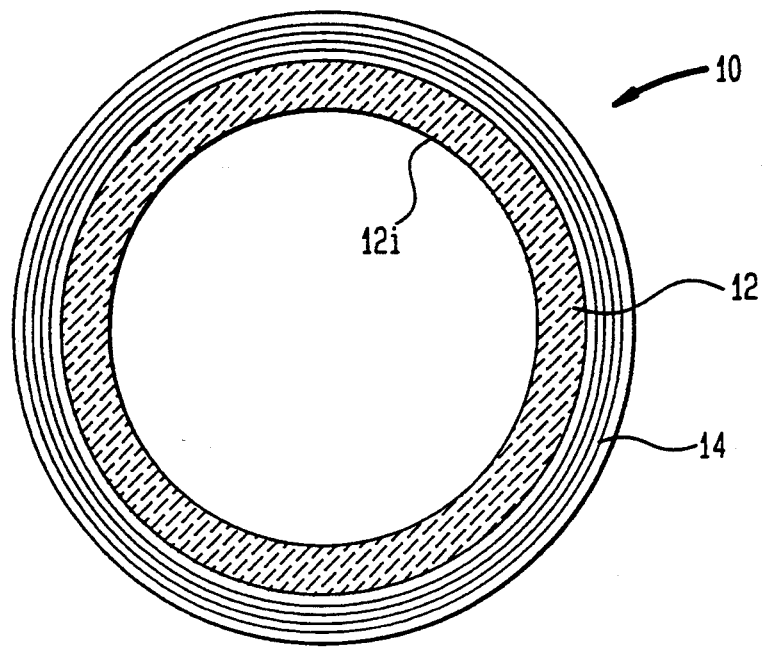
FIG. 2 is a cross-sectional isolated view of the composite structure of the present invention formed as a symmetrical cylinder for use in reciprocating pump, engine or compressor devices.

Although the invention has been described relative to a specific embodiment thereof, there are numerous variations and modifications that will be readily apparent to those skilled in the art in light of the above teachings. For example, in FIG. 1, ceramic liner 12 is shown with a double cam lobe for use in a sliding vane rotary pump. However, the present invention is not so limited. Ceramic liner 12 could also be shaped as a cylindrical core surrounded by cladding 14 as shown in the isolated cross-sectional view of FIG. 2. Such a construction would find utility in a reciprocating pump, engine or compressor device. One such reciprocating pump utilizing the present invention is shown in the cross-sectional side view of FIG. 3. The moving portion of reciprocating pump 200 includes a piston 202 driven by a crank arm 204. As piston 202 moves up and down, the sides 202s of piston 202 rub against the inner wear surface 12i of liner 12. Liner 12 is pre-stressed by wound cladding 14 in the same manner as described above. The resulting composite structure fits within pump housing 201. It is therefore to be understood that, within the scope of the appended claims, the invention may be practiced other than as specifically described.

What is claimed is:

1. A composite structure forming a wear surface, comprising:
    a hollow ceramic inner core having an inner circumference defining a wear surface; and
    a wound outer cladding concentrically surrounding said ceramic inner core, wherein said wound outer cladding is placed in tension around said ceramic inner core to form an interference fit with said ceramic inner core, said wound outer cladding providing a pre-stress to said ceramic inner core.

2. A composite structure forming a wear surface as in claim 1 wherein said ceramic inner core is selected from the group of materials consisting of silicon nitride, aluminum oxide, tungsten carbide, and silicon carbide.

3. A composite structure forming a wear surface as in claim 1 wherein said ceramic inner core is formed from a plurality of component pieces held in position by said wound outer cladding.

4. A composite structure forming a wear surface as in claim 1 wherein said wound outer cladding comprises a filament wound outer cladding.

5. A composite structure forming a wear surface as in claim 4 wherein said filament wound outer cladding uses a filament material selected from the group consisting of carbon, glass, and boron.

6. A composite structure forming a wear surface as in claim 1 wherein said wound outer cladding comprises a braid wound outer cladding.

7. A composite structure forming a wear surface as in claim 6 wherein said braid wound outer cladding uses a braid material selected from the group consisting of carbon, glass, and boron.

8. A per-stressed composite liner structure for use in tribological systems where rubbing and wear occurs such as associated with a pump, engine, compressor or systems having bearings rotating within a journal, comprising:
    a hollowed ceramic core having an inner circumference defining a wear surface of said liner structure; and
    a wound cladding concentrically surrounding said ceramic core, wherein said ceramic core and said wound cladding form an interference fit with one another to pre-stress said ceramic core in terms of tensile strength.

9. A pre-stressed composite liner structure as in claim 8 wherein said ceramic core is selected from the group of materials consisting of silicon nitride, aluminum oxide, tungsten carbide, and silicon carbide.

10. A pre-stressed composite liner structure as in claim 8 wherein said ceramic core is formed from a plurality of component pieces held in position by said wound cladding.

11. A pre-stressed composite liner structure as in claim 8 wherein said wound cladding comprises a filament wound cladding.

12. A pre-stressed composite liner structure as in claim 11 wherein said filament wound cladding uses a filament material selected from the group consisting of carbon, glass, and boron.

13. A pre-stressed composite liner structure as in claim 8 wherein said wound cladding comprises a braid wound cladding.

14. A pre-stressed composite liner structure as in claim 13 wherein said braid wound cladding uses a braid material selected from the group consisting of carbon, glass, and boron.

* * * * *